United States Patent Office 3,089,852
Patented May 14, 1963

3,089,852
EXTREME PRESSURE LUBRICATING COMPOSITIONS
Stephen A. Herbert, Jr., and Duncan W. Frew, Martinez, Calif., assignors to Shell Oil Company, a corporation of Delaware
No Drawing. Filed Dec. 23, 1958, Ser. No. 782,389
13 Claims. (Cl. 252—32.7)

This invention relates to lubricating oil compositions, and more particularly, to hydrocarbon lubricating oil compositions which possess good detergent extreme pressure and load carrying properties and to additives therefor.

It has been observed that various polypolar containing polymeric alkanes, particularly those containing basic amino-nitrogen groups, hydroxy groups and/or oil-soluble carboxylate groups are capable of improving the detergency, viscosity index and pour point properties of various types of lubricating oils. However, polymeric compounds of this type lack extreme pressure, load carrying and wear inhibiting properties. In order to impart these desirable properties to lubricants containing polymers having basic-nitrogen groups, hydroxyl groups and/or ester groups, secondary additives which are known to possess extreme pressure properties are normally added to such lubricating composition. However, in most cases such combinations result in undesirable side effects such as sludging, instability, phase separation and the like.

It has now been discovered that stable, highly detergent, wear-resistant, extreme pressure and load carrying lubricating oils can be provided by incorporating therein a minor amount of from about 0.1% to 10%, preferably from about 0.5% to 6% by weight of a novel oil-soluble polyalcohol polyester polythiophosphate polyalkane containing a plurality of oil-solubilizing hydrocarbyl radicals of at least 8 carbon atoms in the molecule.

The polysubstituted normal alkanes which are effective to attain the objectives of the invention are obtainable by reacting the corresponding oil-soluble high molecular weight polyalcohol polyester containing alkane polymer with a phosphorus sulfide, e.g., $P_2S_5$ or $P_4S_3$ etc. Salts of the reaction product can be prepared by reacting the phosphorus sulfide-polymer reaction product with an inorganic metal compound such as mono or polyvalent metal compounds.

The intermediate polyalcohol polyester product can be prepared by the method described in U.S. Patent 2,800,453 which essentially involves hydrolyzing a copolymer of a long chain alpha-olefinic hydrocarbon (normal or branched-chain) containing at least 10 carbon atoms with a vinyl ester of a lower fatty acid having up to 5 carbon atoms.

This intermediate product is a macromolecular substance having a molecular weight of from about 4000 to about 50000 and contains at least 80% hydroxyl, preferably at least 90% or as high as 99% and the remaining polar group being carboxylate group of the non-acidic oxygen-containing polar mixture.

The alpha-olefinic suitable to form the copolymers include monomers having a single terminal ethylenic group and containing from 10 to 40 carbon atoms and preferably from 12 to 30 carbon atoms.

The following examples are given as illustrative of suitable intermediate products and their preparation:

EXAMPLE I 2.5 moles of vinyl acetate and 1 mole of a mixture of $C_{16}$ to $C_{18}$ alpha-olefins, predominantly $C_{18}$ olefin, and 1% ditertiary butyl peroxide were placed in a stainless steel bomb and the air replaced with nitrogen. The bomb was heated to 115° C. until there was about 90% conversion. The product was topped at 185° C. at 1 mm. Hg pressure.

The polymer product was then mixed with methanol and sodium methylate so as to effect a 95% conversion of the acetate groups to hydroxyl groups. This was accomplished by adding 10 parts of methanol, 35 parts of isopropyl alcohol and 1 part of sodium methylate per 50 parts of the copolymer and neutralizing with stirring for 8 hours at 70° C. Sodium acetate was then removed by washing twice with 1 part of a 33% isopropyl alcohol-water mixture. After settling, the lower layer was drained off and all low boiling components stripped off at a temperature of 110° C. at 90 mm. Hg. The resulting copolymer was a sticky yellow solid. Analysis:

Mol ratio of acetate plus alcohol groups to olefin $C_{14}$—$C_{16}$ alkyl groups _____ 5/1
Mol wt. _____ 2700
Mol ratio of hydroxyl to acetate groups _____ 19/1

Following essentially the procedure of Example I, other products were prepared as Examples II through XXI in accordance with the following tabulation, showing the polymerization catalyst, polymerization temperature, ratio of vinyl ester to olefin used and ratio in the product, degree of hydrolysis of the ester groups and average molecular weight.

| Example | Catalyst | Temperature, °C. | Vinyl Acetate/Alpha-Olefin Ratio in Monomer | Vinyl Acetate/Alpha-Olefin Ratio in Polymer | Degree of Hydrolysis | Mol. Wt. |
|---|---|---|---|---|---|---|
| II | ditertiarybutyl-peroxide | 115 | 2.5/1 ($C_{16-18}$ Olefin) | 5 | 92 | 27,000 |
| III | ----do---- | 115 | 1.9/1 ($C_{16}$–$C_{18}$ Olefin) | 2.6 | 95 | 11,000 |
| IV | ----do---- | 115 | 1/1 ($C_{16}$–$C_{18}$ Olefin) | 2 | 95 | 8,000 |
| V | ----do---- | 130 | 2.5/1 ($C_{16}$–$C_{18}$ Olefin) | 4.9 | 92 | 20,000 |
| VI | ----do---- | 140 | ----do---- | 5 | 95 | 20,000 |
| VII | ----do---- | 140 | 4.0/1 ($C_{16}$–$C_{18}$ Olefin) | 4.9 | 90 | 30,000 |
| VIII | benzoyl peroxide | 80 | 1.6/1 (octadecene) | 3.6 | 95 | 16,500 |
| IX | ----do---- | 80 | 2/1 (octadecene) | 4.06 | 97 | 20,000 |
| X | ----do---- | 110 | ----do---- | 3.4 | 88 | 8,330 |
| XI | ----do---- | 80 | ----do---- | 1.52 | 95 | 5,120 |
| XII | ----do---- | 80 | ----do---- | 1.72 | 95 | 5,710 |
| XIII | ----do---- | 80 | 2.5/1 (octadecene) | 4.1 | 95 | 20,100 |
| XIV | ----do---- | 80 | 2/1 (octadecene) | 3.89 | 97 | 14,200 |
| XV | ----do---- | 115 | 3/1 (octadecene) | 4.1 | 90 | 11,000 |
| XVI | ----do---- | 80 | 2/1 (dodecene) | 2.6 | 90 | 8,000 |
| XVII | ----do---- | 80 | 2/1 (hexadecene) | 3.1 | 90 | 8,000 |
| XVIII | dichlorobenzoyl peroxide | 60 | ----do---- | 2.14 | 90 | 16,400 |
| XIX | benzoyl peroxide | 80 | 2/1 (vinylbutyrate/alpha-octadecene) | 2.1 | 90 | 8,000 |
| XX | ----do---- | 80 | 1/1.2 (octadecene) ($CO_2$ modified) | 1 | 95 | 8,000 |
| XXI | ----do---- | 80 | 1/1.2 (hexadecene) ($CO_2$ modified) | 1 | 95 | 8,000 |

Phosphorizing-sulfurizing the above intermediate partially hydrolyzed polymeric compounds in order to form the thiophosphates can be carried out by heating the polymer to an elevated temperature of around 200° F. or higher, preferably in an inert solvent such as a light hydrocarbon, e.g., toluene, light mineral oil and slowly adding the phosphorus sulfide. After the addition is completed, the temperature of the reaction is increased to 250–400° F. and preferably is maintained between 250 and 300° F. until all of the phosphorizing-sulfurizing agent has reacted and evolution of hydrogen sulfide ceases. If desired, the reaction product can be purified or refined by solvent treatment.

The mole ratio of the polymer compound to the phosphorus sulfide reagent may vary over wide limits, such as from 10:1, preferably 6:1 to 3:1 moles of the above-mentioned reagents, respectively.

At least 10% and preferably from 20% to 80% or higher of the oxygen-containing groups of the polymer are converted to thiophosphate groups after treatment of the intermediate polymer with a phosphorus sulfide. The phosphorus sulfide polypolaralkane polymeric reaction product can be used in their salt form as partial or complete salt. The salt may be formed by partial or complete neutralization of the acidic phosphorus-sulfur group of the reaction product with a suitable base such as monovalent or polyvalent metal oxides, hydroxides, or carbonates such as alkali metal hydroxides, e.g., sodium or potassium hydroxides, alkaline earth metal hydroxides, oxides or carbonates, e.g., calcium, barium, zinc oxide, hydroxide or carbonate or mixtures thereof.

Specific examples of additives to be used and their preparation are as follows:

EXAMPLE A

Thirty grams of the intermediate product of Example I was dissolved in 50 ml. of toluene and the solution was heated to reflux (110° C.) and 13.9 gm. of $P_2S_5$ is added slowly over a period of one-half hour. Next 11.5 ml. of sec. butyl alcohol is added and the mixture refluxed for an additional two and one-half hours when evolution of $H_2S$ ceased. To the reaction mixture was added 10 gm. of zinc carbonate with stirring and heating for about one-half hour and the mixture was allowed to stand over night. The reaction mixture is then filtered through a celite mat resulting in a light amber colored solution and on analysis contained 12.4% S and 5.2% P.

EXAMPLE B

Sixty grams of additive of Example VII is dissolved in 500 ml. of xylene. The solution is heated to reflux (140° C.) and 4.5 of $P_2S_5$ is added over a period of one-half hour. The mixture is then heated for four additional hours. After which time 10 gm. of zinc carbonate is added and the mixture is heated with stirring for an hour. Upon filtering through celite, a clear light amber solution resulted and on analysis contained 4.8% S and 1.6% P.

EXAMPLE C

A solution of $CO_2$ modified copolymer of hydrolyzed vinyl acetate/alpha-octadecene (Example XX) in xylene was used. The solid polymer had a base No. of 324. Sixty grams of the basic polymer was diluted with 30 mols toluene and the mixture was heated to 80° C. and 3.2 grams of $P_2S_5$ was added thereto over a one-half hour period. The mixture was heated at 80° C. for an additional hour. A clear solution resulted. The base No. decreased to 109 indicating the formation of a calcium salt which on analysis contained 3% S and 1.7% P.

EXAMPLE D

The reaction product of Example VIII reacted with $P_4S_3$ under the conditions of Example A to convert about 20% of the hydroxyl groups to thiophosphate groups.

EXAMPLE E

The reaction product of Example VII reacted with $P_4S_3$ at 350° F. until evolution of $H_2S$ ceases to convert about 40% of the hydroxyl groups to thiophosphate groups.

EXAMPLE F

The partial Ca salt of Example A prepared by dissolving Example A in xylene and neutralizing it with about 40% of the stoichiometry amount of calcium oxide, heating the mixture thereof for over two hours and thereafter removing the solvent.

EXAMPLE G

The procedure of Example F was followed to form the partial Ba salt and using as the neutralizing agent barium hydroxide.

Other salts include sodium, potassium, calcium, barium, and zinc salts of the products of Examples A, B, C, and D as well as the sodium barium and zinc salts of $P_2S_5$-Example III copolymer product, $P_2S_5$-Example IX copolymer product and $P_2S_5$-Example IV copolymer product.

The mineral lubricating oils used in compositions of this invention can be obtained from any paraffinic, naphthenic, asphaltic, or mixed base crude, and/or mixtures thereof. The viscosity of these oils may vary over a wide range, such as from 100 S.U.S. at 100° F. to 100 S.U.S. at 210° F. The hydrocarbon oils may be blended with fixed oils such as castor oil, lard oil and the like and/or with synthetic lubricants such as polymerized olefins, copolymers of alkylene glycols and the alkylene oxides, silicone polymers, e.g., dimethyl silicone polymers and the like.

Suitable mineral lubricating oils which may be used in compositions of the invention can be obtained from various crudes such as West Texas Ellenburger, East Texas, Oklahoma and California crudes. A typical useful solvent refined East Texas mineral lubricating oil has the following properties:

| | |
|---|---|
| Pour point, ° F. | +10 |
| Viscosity centistokes at 100° F. | 27 |
| Viscosity index | 95 |

The additive is effective in lubricating oil compositions in amounts ranging from about 0.1% to about 10% and preferably from about 0.5% to 6% by weight, based on the final lubricating oil composition.

Compositions of this invention are illustrated by the following:

*Composition A:*
| | |
|---|---|
| Example E | 5% by wt. |
| Refined mineral lubricating oil (SAE30) (VI55) | Essentially balance. |

*Composition B:*
| | |
|---|---|
| Example F | 5% by wt. |
| Refined mineral lubricating oil (SAE30) (VI95) | Essentially balance. |

*Composition C:*
| | |
|---|---|
| Example A | 5% by wt. |
| Refined mineral lubricating oil (SAE20) (VI50–55) | Essentially balance. |

*Composition D:*
| | |
|---|---|
| Example E | 3% by wt. |
| Zinc di 2-ethylhexyl dithiophosphate | 0.2% by wt. |
| Refined mineral lubricating oil (SAE30) (VI90) | Essentially balance. |

*Composition E:*
| | |
|---|---|
| Example B | 3% by wt. |
| Basic Ca petroleum sulfonate | 1% by wt. |
| Refined mineral lubricating oil (SAE30) (VI50–55) | Essentially balance. |

Other examples of compositions of this invention include mineral lubricating oils of SAE 10, 20, 30, or 10

W-30 type containing from 1% to 6% of $P_2S_5$-Example III copolymer reaction product $P_2S_5$-Example IX copolymer reaction product and the sodium, calcium, barium and zinc salts thereof.

The lubricating oil compositions of this invention (A, B, C, D, E and F) when tested in the Shell 4-Ball E.P. Tester (Mean Hertz Load) had load carrying capacities of two to four times that of the neat mineral lubricating oil (without additive) or a mineral lubricating oil containing about 5% of Example I (intermediate additive) containing no phophorus or sulfur in the molecule and were in addition non-sludging and non-corrosive when tested in the ASTM Copper Strip Corrosion Test.

Compositions of this invention are useful for providing superior detergent, extreme pressure load-carrying and wear inhibiting properties to lubricating oils which contain small amounts (0.1% to 3%) of other agents such as metal dithiophosphates (Zn di-2-ethylhexyl dithiophosphate), metal organic sulfonates, e.g., neutral or basic Ca, Ba or Zn petroleum sulfonate, metal, thiocarbamates, e.g., Zn, Cr or Ca dibutyl or diamyl dithiocarbamate; amines such as phenyl-alpha-naphthylamine, octadecylamine; alkyl phenol, viscosity-index improvers and pour point depressants such as the oil-soluble methacrylates made by Rohm and Haas under the name "Acryloids," and specifically, "Acryloid," 150, 618, 710 and/or 768, and described in U.S. Patent 2,710,842; condensation products of chlorinated paraffin wax and naphthalene; and other conventional oil additives such as amine salts of mono or trichloromethane phosphonic acid, or the ester or amide of said acids; organic sulfides and mixtures thereof.

The oil compositions of this invention are useful as engine oils, turbine oils, gear oils, and in various other fields of lubrication where detergency, extreme pressure load and wear inhibiting properties are essential.

We claim as our invention:

1. A lubricating composition comprising a major amount of a mineral lubricating oil and from about 0.1% to about 10% of an oil-soluble reaction product of a phosphorus sulfide and hydrolyzed copolymer of an alpha-hydrocarbon-olefin containing from 10 to 40 carbon atoms with a vinyl ester of a lower fatty acid of up to five carbon atoms, in the mol ratio of from 1/1 to 1/5, respectively, the phosphorus sulfide and the copolymer reactants being present in the mol ratio of about 1:10 respectively and the two materials reacted under reflux conditions in an inert solvent until evolution of $H_2S$ ceases and having a molecular weight of from 4,000 to 50,000.

2. A lubricating composition comprising a major amount of mineral lubricating oil and from about 0.1% to about 10% of an oil-soluble reaction product of $P_2S_5$ and hydrolyzed copolymer of alpha-hydrocarbon olefin containing from 10 to 40 carbon atoms with a vinyl ester of a lower fatty acid of up to 5 carbon atoms in the mol ratio of 1/1 to 1/5, respectively, the phosphorus sulfide and the copolymer reactants being present in the mol ratio of about 1:10 respectively and the two materials reacted under reflux conditions in an inert solvent until evolution of $H_2S$ ceases, and having a molecular weight of from 4,000 to 50,000.

3. The composition of claim 2 wherein the alpha-hydrocarbon olefin is $C_{12-30}$ alpha-hydrocarbon olefin and the vinyl ester is vinyl acetate.

4. The composition of claim 2 wherein the alpha-hydrocarbon olefin is alpha-octadecene and the vinyl ester is vinyl acetate.

5. A lubricating composition comprising a major amount of mineral lubricating oil and from about 0.1% to about 10% of an oil-soluble metal selected from the group consisting of alkali metal and alkaline earth metal salt of the reaction product of $P_2S_5$ and hydrolyzed copolymer of alpha-hydrocarbon olefin containing from 10 to 40 carbon atoms with a vinyl ester of a lower fatty acid of up to 5 carbon atoms in the mol ratio of 1/1 to 1/5, respectively, the phosphorus sulfide and the copolymer reactants being present in the mol ratio of about 1:10 respectively and the two materials reacted under reflux conditions in an inert solvent until evolution of $H_2S$ ceases, and having a molecular weight of from 4,000 to 50,000.

6. A lubricating composition comprising a major amount of mineral lubricating oil and from about 0.1% to about 10% of an oil-soluble alkali metal salt of the reaction product of $P_2S_5$ and hydrolyzed copolymer of alpha-hydrocarbon olefin containing from 10 to 40 carbon atoms with a vinyl ester of a lower fatty acid of up to 5 carbon atoms in the mol ratio of 1/1 to 1/5, respectively, the phosphorus sulfide and the copolymer reactants being present in the mol ratio of about 1:10 respectively and the two materials reacted under reflux conditions in an inert solvent until evolution of $H_2S$ ceases, and having a molecular weight of from 4,000 to 50,000.

7. A lubricating composition comprising a major amount of mineral lubricating oil and from about 0.1% to about 10% of an oil-soluble alkaline earth metal salt of the reaction product of $P_2S_5$ and hydrolyzed copolymer of alpha-hydrocarbon olefin containing from 10 to 40 carbon atoms with a vinyl ester of a lower fatty acid of up to 5 carbon atoms in the mol ratio of 1/1 to 1/5, respectively, the phosphorus sulfide and the copolymer reactants being present in the mol ratio of about 1:10 respectively and the two material reacted under reflux conditions in an inert solvent until evolution of $H_2S$ ceases, and having a molecular weight of from 4,000 to 50,000.

8. The composition of claim 5 wherein the alpha-hydrocarbon olefin is $C_{12-30}$ alpha-hydrocarbon olefin and the vinyl ester if vinyl acetate.

9. The composition of claim 5 wherein the alpha-hydrocarbon olefin is alpha-octadecene and the vinyl ester is vinyl acetate.

10. A lubricating composition comprising a major amount of mineral lubricating oil and from 0.1 to 10% of an oil-soluble sodium salt of the reaction product of $P_2S_5$ and hydrolyzed copolymer of alpha-octadecene and vinyl acetate, in mol ratio of 1/1 to 1/5, respectively, the phosphorus sulfide and the copolymer reactants being present in the mol ratio of from 1:3 to 1:6 respectively and the two materials reacted at 250–400° F. in a light hydrocarbon until evolution of $H_2S$ ceases, and having a molecular weight of from 4,000 to 50,000.

11. A lubricating composition comprising a major amount of mineral lubricating oil and from 0.1 to 10% of an oil-soluble barium salt of the reaction product of $P_2S_5$ and hydrolyzed copolymer of alpha-octadecene and vinyl acetate, in mol ratio of 1/1 to 1/5, respectively, the phosphorus sulfied and the copolymer reactants being present in the mol ratio of from 1:3 to 1:6 respectively and the two material reacted at 250–400° F. in a light hydrocarbon until evolution of $H_2S$ ceases, and having a molecular weight of from 4,000 to 50,000.

12. A lubricating composition comprising a major amount of mineral lubricating oil and from 0.1 to 10% of an oil-soluble calcium salt of the reaction product of $P_2S_5$ and hydrolyzed copolymer of alpha-octadecene and vinyl acetate, in mol ratio of 1/1 to 1/5, respectively, the phosphorus sulfide and the copolymer reactants being present in the mol ratio of from 1:3 to 1:6 respectively and the two materials reacted at 250–400° F. in a light hydrocarbon until evolution of $H_2S$ ceases, and having a molecular weight of from 4,000 to 50,000.

13. A lubricating composition comprising a major amount of mineral lubricating oil and from 0.1 to 10% of an oil-soluble zinc salt of the reaction product of $P_2S_5$ and hydrolyzed copolymer of alpha-octadecene and vinyl acetate, in mol ratio of 1/1 to 1/5, respectively, the phosphorus sulfide and the copolymer reactants being present in the mol ratio of from 1:3 to 1:6 respectively and the two materials reacted at 250–400° F. in a light hydrocarbon until evolution of $H_2S$ ceases, and having a molecular weight of from 4,000 to 50,000.

(References on following page)

References Cited in the file of this patent

UNITED STATES PATENTS

| | | |
|---|---|---|
| 2,242,260 | Prutton | May 20, 1941 |
| 2,316,085 | Kelso et al. | Apr. 6, 1943 |
| 2,316,088 | Loane et al. | Apr. 6, 1943 |
| 2,364,284 | Freuler | Dec. 5, 1944 |
| 2,406,575 | Young et al. | Aug. 27, 1946 |
| 2,785,128 | Popkin | Mar. 12, 1957 |
| 2,800,450 | Bondi et al. | July 23, 1957 |
| 2,800,452 | Bondi et al. | July 23, 1957 |
| 2,800,453 | Bondi et al. | July 23, 1957 |